(12) United States Patent
Basu et al.

(10) Patent No.: US 11,171,791 B2
(45) Date of Patent: Nov. 9, 2021

(54) SYSTEMS AND METHODS OF AGGREGATE SIGNING OF DIGITAL SIGNATURES ON MULTIPLE MESSAGES SIMULTANEOUSLY USING KEY SPLITTING

(71) Applicant: 0Chain, LLC, San Jose, CA (US)

(72) Inventors: Saswata Basu, Cupertino, CA (US); Siva Dirisala, Cupertino, CA (US)

(73) Assignee: 0Chain, LLC, San Jose, CA (US)

( * ) Notice: Subject to any disclaimer, the term of this patent is extended or adjusted under 35 U.S.C. 154(b) by 411 days.

(21) Appl. No.: 16/247,994

(22) Filed: Jan. 15, 2019

(65) Prior Publication Data

US 2020/0228349 A1 Jul. 16, 2020

(51) Int. Cl.
| | | |
|---|---|---|
| *H04L 9/32* | (2006.01) | |
| *H04L 9/08* | (2006.01) | |
| *H04L 9/06* | (2006.01) | |

(52) U.S. Cl.
CPC .......... *H04L 9/3255* (2013.01); *H04L 9/0637* (2013.01); *H04L 9/085* (2013.01); *H04L 9/0869* (2013.01); *H04L 9/0894* (2013.01); *H04L 2209/30* (2013.01); *H04L 2209/38* (2013.01); *H04L 2209/80* (2013.01)

(58) Field of Classification Search
CPC ..... H04L 9/3255; H04L 9/0637; H04L 9/085; H04L 9/0869; H04L 9/0894; H04L 2209/30; H04L 2209/38; H04L 2209/80
See application file for complete search history.

(56) References Cited

U.S. PATENT DOCUMENTS

| | | | | |
|---|---|---|---|---|
| 6,314,521 | B1* | 11/2001 | Debry | H04L 9/3263 726/10 |
| 2010/0037055 | A1* | 2/2010 | Fazio | H04L 9/3255 713/171 |
| 2012/0198228 | A1* | 8/2012 | Oberheide | H04L 63/061 713/155 |
| 2016/0358158 | A1* | 12/2016 | Radocchia | G07G 1/009 |
| 2018/0367298 | A1* | 12/2018 | Wright | H04L 9/3247 |
| 2020/0026834 | A1* | 1/2020 | Vimadalal | G06F 16/182 |

OTHER PUBLICATIONS

Armory. Armory Secure Wallet, https://www.bitcoinarmory.com/, 2016.
Daniel J. Bernstein. The go programming language, https://golang.org/.

(Continued)

*Primary Examiner* — Saleh Najjar
*Assistant Examiner* — Devin E Almeida
(74) *Attorney, Agent, or Firm* — Levine's Tech Consulting, LLC; Frank E. Levine

(57) ABSTRACT

The systems and methods of aggregate signing of digital signatures on multiple messages simultaneously, comprising: receiving two or more digital messages wherein each message is signed using two or more digitally split keys from a private key and the two or more digital signatures of the message using the split key are combined to get a compressed short signature; receiving the compressed short signature for each message; receiving a public key associated with the private key for each message; aggregate signing the messages to output an aggregate signature. The aggregate signature can be further verified against any or all of the messages.

18 Claims, 9 Drawing Sheets

(56) References Cited

OTHER PUBLICATIONS

Daniel J. Bernstein. Curve25519: New die-hellman speed records. In Public Key Cryptography—PKC 2006, 9th International Conference on Theory and Practice of Public-Key Cryptography, New York, NY, USA, Apr. 24-26, 2006, Proceedings, pp. 207{228, 2006.
Dan Boneh, Manu Drijvers, and Gregory Neven. Compact multi-signatures for smaller blockchains. In Advances in Cryptology—ASIACRYPT 2018—24th International Conference on the Theory and Application of Cryptology and Information Security, Brisbane, QLD, Australia, Dec. 2-6, 2018, Proceedings, Part II, pp. 435-464, 2018.
Dan Boneh, Craig Gentry, Ben Lynn, and Hovav Shacham. Aggregate and verifiably encrypted signatures from bilinear maps. In Advances in Cryptology—EUROCRYPT 2003, International Conference on the Theory and Applications of Cryptographic Techniques, Warsaw, Poland, May 4-8, 2003, Proceedings, pp. 416-432, 2003.
Dan Boneh, Ben Lynn, and Hovav Shacham. Short signatures from the weil pairing. In Advances in Cryptology—ASIACRYPT 2001, 7th International Conference on the Theory and Application of Cryptology and Information Security, Gold Coast, Australia, Dec. 9-13, 2001, Proceedings, pp. 514{532, 2001.
Shayan Eskandari, Jeremy Clark, David Barrera, and Elizabeth Stobert. A first look at the usability of bitcoin key management. CoRR, abs/1802.04351, 2015.
Sergey Gorbunov. How not to use aggregate signatures in your blockchain, https:medium.com/@sergey nog /how-not-to-use-aggregate-signatures -in-your-blockchain -63e05be2cbbe.
G Locke and P Gallagher. Fips pub 186-3: Digital signature standard (dss). Federal Information Processing Standards Publication, 3:186{3, 2009.
Ben Lynn. The pbc library. https://crypto.stanford.edu/pbc/.
Hartwig Mayer. Ecdsa security in bitcoin and ethereum: a research survey. CoinFaabrik, Jun. 28, 2016.
C. Research. SEC 2: Recommended Elliptic Curve Domain Parameters 2010. http://www.secg.org/sec2-v2.pdf, 2010.
Claus-Peter Schnorr. Efficient signature generation by smart cards. J. Cryptology, 4(3):161-174, 1991.
Yunlei Zhao. Aggregation of gamma-signatures and applications to bitcoin. Cryptology ePrint Archive, Report 2018/414, 2018. https://eprint.iacr.org/2018/414.

* cited by examiner

BLS Keys
Private Key: $x \in \mathbb{Z}_q^*$
Public key: $X = xP$
$\sigma = xH(m)$

| Device 1 | Device 2 |
|---|---|
| Accept mnemonic$_1$ $x_1 = H_1(\text{mnemonic}_1)$ $x_2 = x - x_1$ Store $x_1$ and $x_2P$ Send $x_2$ to device 2 | Accept Passcode $s_1 = x_2 \oplus H_1(Passcode)$ Store $s_1$ |

Table 1: Our Key-Split algorithm

FIG. 4

| Device 2 | Device 1 |
|---|---|
| Accept Passcode | |
| $x_2 = s_1 + H_1(Passcode)$ | |
| $\sigma_2 = x_2 H(m)$ | |
| Send $\sigma_2$ to device 1 | |
| | Check if $\hat{e}(\sigma_2, P) \stackrel{?}{=} \hat{e}(H(m), x_2 P)$ |
| | $\sigma = x_1 H(m) + \sigma_2 = x_1 H(m) + x_2 H(m)$ |
| | $= x H(m)$ |
| | Output $\sigma$ as the signature for $m$ |

Table 2: Signing Workflow

FIG. 5

| Feature | Schnorr [13] | ECDSA | Γ-Signature [14] | Our Approach |
|---|---|---|---|---|
| Size of 1 signature | $\|Z_q\| + \|G\|$ | $2\|Z_q\|$ | $2\|Z_q\|$ | $\|G\|$ |
| Size of n signatures(aggregated) | $\|Z_q\| + n\|G\|$ | $(2n)\|Z_q\|$ | $(n+1)\|Z_q\|$ | $\|G\|$ |
| Complexity of 1 signature Generation | $RA$ | $RA$ | $RA$ | $2RA + PA$ |
| Complexity of n signature Generation | $(n)RA$ | $(n)RA$ | $(n)RA$ | $(2n)RA + nPA$ |
| Complexity of 1 verification | $2RA + PA$ | $2RA$ | $2RA + PA$ | 2 Pairing |
| Complexity of n verification | $(n+1)RA + nPA$ | $(2n)RA + PA$ | $(2n+1)RA + (n+1)PA$ | $(n+1)$ Pairing |
| Size of Public Key | $\|G\|$ | $\|G\|$ | $\|G\|$ | $\|G\|$ |

Table 3: The Efficiency comparisons of Schnorr,ECDSA, Γ- Signatures and our Signature scheme based on BLS. Abbreviations: RA- Repeated Point Addition, PA- Point Addition

FIG. 8

| Schnorr Signature | Aggregation Cost | Verification Cost | Aggregation + Verification Cost |
|---|---|---|---|
| 1 Signature | Not Possible | 418.9 µs | - |
| 100 Signatures | Not Possible | 43.55 ms | - |
| 300 Signatures | Not Possible | 125.3 ms | - |
| 400 Signatures | Not Possible | 165.31 ms | - |
| 500 Signatures | Not Possible | 204.83 ms | - |
| 1000 Signatures | Not Possible | 411.36 ms | - |
| ECDSA Signature | Aggregation Cost | Verification Cost | Aggregation + Verification Cost |
| 1 Signature | Not Possible | 280.1 µs | - |
| 100 Signatures | Not Possible | 22.65 ms | - |
| 300 Signatures | Not Possible | 60.3 ms | - |
| 400 Signatures | Not Possible | 86.17 ms | - |
| 500 Signatures | Not Possible | 104.32 ms | - |
| 1000 Signatures | Not Possible | 211.62 ms | - |
| Γ− Signature | Aggregation Cost | Verification Cost | Aggregation + Verification Cost |
| 1 Signature | - | 25.57 ms | 25.57 ms |
| 100 Signatures | 2.30 s | 2.61 s | 5.2 s |
| 300 Signatures | 7.18 s | 7.62 s | 15.2 s |
| 400 Signatures | 10.19 s | 10.24 s | 20.43 s |
| 500 Signatures | 12.81 s | 12.97 s | 25.78 s |
| 1000 Signatures | 27.6 s | 27.67 s | 55.3 s |
| Our Scheme | Aggregation Cost | Verification Cost | Aggregation + Verification Cost |
| 1 Signature | - | 1.85 ms | 1.85 ms |
| 100 Signatures | 183.61 ms | 1.74 ms | 185.36 ms |
| 300 Signatures | 548.53 ms | 1.83 ms | 550.37 ms |
| 400 Signatures | 720 ms | 1.79 ms | 721.8 ms |
| 500 Signatures | 925.46 ms | 1.90 ms | 927.36 ms |
| 1000 Signatures | 1.85 s | 1.88 ms | 1.85 s |

Table 4: Performance Evaluation of our Signature scheme, Schnorr Signature scheme, ECDSA scheme and Γ-signature scheme for aggregation and verification cost. Note that Schnorr and ECDSA do not support aggregation.

FIG. 9

SYSTEMS AND METHODS OF AGGREGATE SIGNING OF DIGITAL SIGNATURES ON MULTIPLE MESSAGES SIMULTANEOUSLY USING KEY SPLITTING

If an Application Data Sheet (ADS) has been filed on the filing date of this application, it, is incorporated by reference herein. Any applications claimed on the ADS for priority under 35 U.S.C. §§ 119, 120, 121, or 365(c), and any and all parent, grandparent, great-grandparent, etc, applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefitsi under 35 USC § 119(e) for provisional patent applications, for any and all parent, grandparent, great-grandparent, etc. applications of the Priority Application(s)). In addition, the present application is related to the "Related Applications," if any, listed below.

FIELD OF THE INVENTION

The present invention is in the technical field of digital signatures. More particularly, the present invention is in the technical field of signing and verifying digital messages for authentication, non-repudiation and integrity. More particularly, the present invention is in the technical field of aggregate signing of two or more messages to generate an aggregate signature using key-splitting.

BACKGROUND

Messages exchanged over the internet or a network in and itself do not have information as to the source and the recipient does not know whether to trust such a message or not. Digital signatures are a standard element to ensure that the message is, sent by the person who says he sent it, was not changed during the transmission and the person cannot later deny having sent that message.

Internet is a global computer network providing a variety of information and communication facilities, consisting of interconnected networks using standardized communication protocols. Internet is not owned by a single entity and it operates without a central governing body. The same principles of distributed governance were applied to digital currencies by providing ability to perform digital transactions that existed without support from any underlying institution. The digital ledger that records the transactions in a chain using a mathematical hierarchy is called a blockchain.

The current blockchain platform and related applications are bogged down and slow because of intensive cryptographic functions that need to be performed to authenticate, verify and confirm transactions. Length of a key is an important aspect as to how secure is the system. But use of lengthy keys is inconvenient and cumbersome for the user. Current key schemes do not address solutions that allow for short keys that are convenient to use without compromising the security of the systems.

SUMMARY OF THE INVENTION

The present invention is systems and methods of aggregate signing of digital signatures on multiple messages simultaneously, comprising: receiving two or more digital messages wherein each message is signed using two or more digitally split keys from a private key and the two or more digital signatures of the message using the split key are combined to get a compressed short signature; receiving the compressed short signature for each message; receiving a public key associated with the private key for each message; aggregate signing the messages to output an aggregate signature.

The systems and methods of aggregate signing, further comprising: using one of the split keys as a personal identification number to be entered by a user and storing another of the split keys on a device of the user.

The systems and methods of aggregate signing, wherein the split key is performed using Boneh-Lynn-Shacham short signature scheme.

The systems and methods of aggregate signing, wherein each split key is associated with a hardware device and combining the two or more digital signatures of the message occurs at one of the hardware devices using wifi, bluetooth, near field communication or quick response codes.

The systems and methods of aggregate signing, further comprising: computing the difference between the private key and each split key to generate a Quick Response code that is used to combine the two or more digital signatures; and verifying the Quick Response code using the public key for the split key.

The systems and methods of aggregate signing, wherein each split key is associated with a hardware device, further comprising: combining the two or more digital signatures of the message at one of the hardware devices using Quick Response code; submitting a transaction on a blockchain from one of the hardware devices.

The systems and methods of aggregate signing, further comprising: generating a random text message for signing.

The systems and methods of aggregate signing, wherein receiving the public key for a signed message is from a client identification registry.

The systems and methods of aggregate signing, further comprising: verifying the aggregate signature for any or all of the messages.

The systems and methods of aggregate signing, further comprising: generating the private key or one or more of the split keys based on a mnemonic from a user.

BRIEF DESCRIPTION OF THE DRAWINGS

The embodiments of this invention are illustrated by way of example and not limitation in the figures of the accompanying drawings, in which like references indicate similar elements and in which:

FIG. 4 is Table 1 showing key split algorithm, according to one embodiment.

FIG. 5 is Table 2 showing signing workflow, according to one embodiment.

FIG. 8 is Table 3 showing efficiency comparisons of Schnorr, ECDSA, Γ Signatures and our Signature scheme based on Boneh-Lynn-Shacham scheme gives the flow and exchange of messages in a smart contract controlled system for a storage transaction.

FIG. 9 is Table 4 showing performance evaluation of our signature scheme, schnorr signature scheme, ECDSA scheme and Γ signature scheme for aggregation and verification cost.

DETAILED DESCRIPTION OF THE INVENTION

Figure 1:
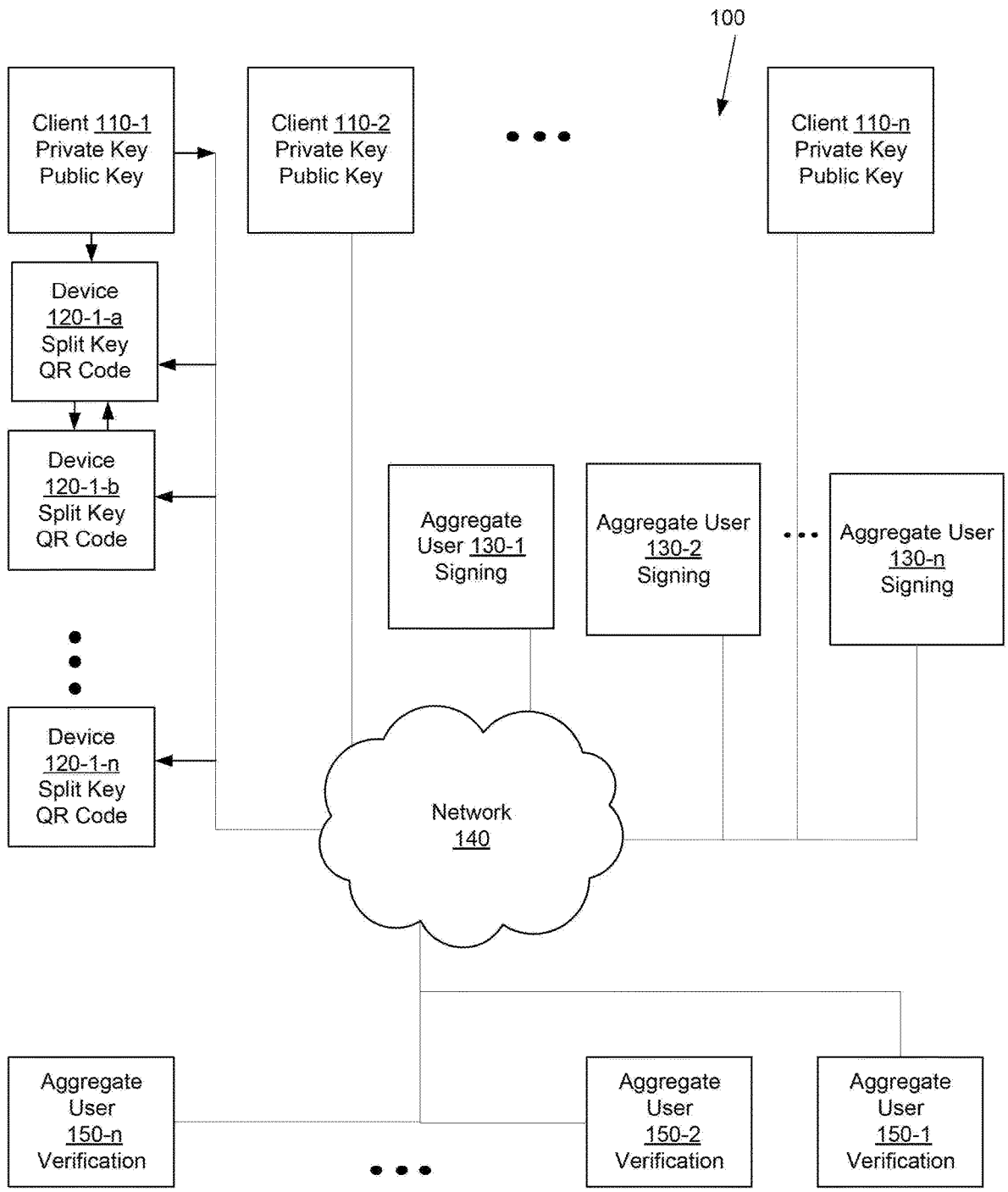
FIG. 1 shows a diagram illustrating an example of a system and method of aggregate signing with key splitting.

The systems and methods of aggregate signing of digital signatures on multiple messages simultaneously reduces computational load on the block formation without compromising with the level of security. The systems and methods of aggregate signing allow key splitting a primary or private key with ease of use for a client. The key splitting can occur multiple times with varying frequency. For example, in some systems, the key splitting could be invoked for each new transaction. In others, a client may decide to periodically update and split keys. Two or more split keys are then used to sign a single message to generate a compressed signature. An aggregate user can then aggregate sign two or messages using the compressed signatures to generate an aggregate signature. Another aggregate user can then verify the signature for any of the received messages or all of them.

In one embodiment, the aggregate signing is used in cloud computing context. In one embodiment, the aggregate signing is used on a blockchain platform. Aggregate signing and verification can be performed by different miners, blobbers or sharders on the block chain platform. Generation of short compressed signatures using key-splitting would be performed at the client systems. This division and simplification of cryptography helps the blockchain with computational efficiency.

In one embodiment, a simple way to manage a user's private key, under a reasonable assumption that the user has two devices at his disposal (say a laptop and a mobile phone) and the single private key is split into partial keys. This is known as key splitting.

At the operational level, scalability is one of the main challenges faced by the users and developers. The focus in embodiment is on the computational efficiency at the time of block formation. Specifically, when the transactions are pooled and a block is formed, sanity check of the selected transactions requires the execution of a signature verification algorithm on each transaction. Besides, every participant must validate all the signatures present in every block and such huge computational overhead severely limits the scalability. Aggregation of signatures is one of the effective solutions to this problem.

In one embodiment, a detailed theoretical and empirical analysis shows that the Boneh-Lynn-Shacham ("BLS") short signature scheme is best suited for achieving both key splitting and aggregation. None of the existing signature schemes work well for both key splitting and aggregation.

The current popular schemes such as the ones used in Bitcoin or Schnorr's scheme implemented over Elliptic curves are neither suitable for aggregation nor can their keys be split in a convenient and meaningful way.

One of the major concerns related to blockchain technology is scalability and in general efficiency/reliability of the whole operation. For instance, every user in this community, sooner or later, directly or indirectly, is forced to deal with challenges of maintaining and managing the cryptographic keys that are used. The subtleties and challenges involved in key generation, maintenance and management are well known in security industry and both cryptographic and policy-based solutions have been devised in the past. However, in the context of cryptocurrencies, we still do not have satisfactory solutions that would help scalability or ease of use.

The second major concern is related to computational efficiency of the tasks performed during the execution of the protocols. One of the most computationally intense and most frequently used cryptographic primitives in blockchain technology is digital signatures. The users need to generate every transaction with appropriate authentication done on the transaction and the minors or validators need to verify/validate the same multiple number of times. The systems and methods of aggregate signing focus on the signing process at the users end and verification process at the block formation/validation end.

In order to handle the challenges and complexities of key management, a number of techniques were proposed and deployed in different cryptocurrencies. In Bitcoin core, the keys are maintained in local storage. A typical user will have access to a wallet software of his choice and use the same to authenticate transactions he is generating. As wallets generate the digital signature, it requires an access to the private key of the user. While this speeds up the wallet operations, the presence of a key for a long time in a system that is online increases its vulnerability. Off-line storage and air gapped storages are used by some systems. Password protected wallets are deployed by certain systems but they do not provide any security against a malware that might read the key strokes etc. Third party hosted wallets are also suggested to remove the pains of key management to a novice user but then it requires enormous amount of trust in a third party.

In view of the shortcomings of the existing systems, the systems and methods of aggregate signing introduces a fresh approach at key generation and management using two systems that may be available with a typical user. The systems and methods of aggregate signing is simple, easy to implement, secure and offers protections against theft/loss of the systems. Given that a typical user may have at his disposal several devices (at least two, say a laptop and a mobile phone/notepad), allowing a possibility to handle key management with relative ease. Specifically, "splitting the private key" into several components and store each in a device so that: (1) System allows for adequate protection even in the case of loss/corruption key. (2) Even in the case of loss/theft of the device, abuse of the key component available in the device. (3) Signature generation must involve all the split component. (4) The individual components of the signatures generated in each device is secure on its own and does not lead to any attacks and key exposure.

The (BLS) short signature scheme of Boneh, Lynn and Shacham is quite amenable for such split-ups and describe a way in which an effective split-up be achieved. Also, such split-up is not possible in Schnorr signature or Elliptic Curve Digital Signature Algorithm (ECDSA) without sharing information between the two devices that generate the partial signatures. The transaction generation as well as the block formation/validation involve running computationally intense signing and verification algorithms. Typically, the block size is kept small by design in order to speed up the communication and in small blocks, it is observed that signatures occupy a significant amount of space. For example, it is estimated that nearly 40% of the transcript space is occupied by signatures in case of bitcoin. The computations involved in some of the deployed signature schemes are found to be very complex. For instance, the most widely used ECDSA combines the long term and short term keys in a non linear fashion and that directly contributes to its inefficiency. Moreover, each block formation calls for verification of a number of signatures (the signatures found in the transactions chosen for pooling) and when the block is broadcast, again the validation process calls for huge number of signature verifications at every node of the network.

In one embodiment, aggregate verification offers an efficient solution. In signature aggregation/verification, we combine several signatures into one "super" signature and carry out the verification only on the super signature rather than on the individual signature. Thus, we see a dramatic drop in the verification cost of n signatures to the cost of verifying one signature. This clearly saves space and a significant amount of computing time. While the aggregation is a neat idea leading to efficiency, it is unfortunate that not all signature schemes are suitable for aggregation. For some schemes, aggregation may not reduce the cost at all and the verification cost may remain the same without any reductions.

The Schnorr or the ECDSA signature does not offer any natural way to aggregate due to the independent randomness deployed in different signatures on different messages. In fact, it is shown that any attempt to aggregate may even lead to serious attack. In view of this fact, fresh attempts are made to create aggregatable signatures and the Gamma $\lceil$-signature scheme is the most recent one. The keys of this scheme cannot be split in any convenient way. Moreover, empirical analysis shown in Table 4 shows that BLS signature is far more efficient than the $\lceil$-signature scheme, Thus, we show that BLS scheme can be tinkered to accommodate key splitting at the users end and can be aggregated for verification at the block generation end. We have presented the details of signature scheme based on key splitting and aggregate verification. We have also carried out performance analysis and compared the running times of our approach with that of the Schnorr, ECDSA and $\lceil$-signature schemes.

In one embodiment, the key split up and aggregation functions can be defined as follows. A signature scheme with key split-up consists of the following, algorithms in the following paragraphs.

Setup($\lambda$): On input of a security parameter $\lambda$, this algorithm generates the public parameters Params.

KeyGen(Params): On input of the public parameters Params, this algorithm generates a public-private key pair (PK, SK) for a user.

Key-split(SK, Params): On input of a private key SK and public parameters Params, this algorithm generates two partial private keys $SK_1$ and $SK_2$ for device 1 and device 2 respectively. This algorithm is run by the user.

Sign-1(m, $SK_{-1}$, Params): On input of a message m and the partial private key $SK_1$, this algorithm outputs the partial signature $\sigma_1$. This algorithm is run on device 1.

Sign-2(m, $SK_2$, Params): On input of a message m and the partial private key $SK_2$, this algorithm outputs the partial signature $\sigma_2$. This algorithm is run on device 2.

Sign-Combine($\sigma_1$, $\sigma_2$, Params): On input of the partial signatures $\sigma_1$ and $\sigma_2$ and the public parameters Params, this algorithm combines the signatures and outputs a compressed short signature $\sigma$. This algorithm is run on device 1.

Verify(m, $\sigma$, PK, Params): On input of an aggregated signature $\sigma$, a public key PK and the public parameters, the algorithm returns "VALID" if $\sigma$ is a valid signature on message m and public key PK. Else, it will output "INVALID."

An aggregate signature scheme with key split-up consists of the following algorithms along with the Setup( ), Key-Gen( ), Key-Split( ), Sign-1( ), Sign-2( ), Verify( ) algorithms described above to enable signature aggregation.

Aggregate-Sign($\Sigma = \{(m_i, \sigma_i, PK_i)\}_{i=1}$ to n, Params): On input of message $m_i$, public key $PK_i$ and signature $\sigma_i$ of n different users and the public parameters Params, this algorithm generates and outputs the aggregate signature $\delta$. This algorithm can be run by any user who possess $\Sigma$.

Aggregate-Verify($\delta$, $\{m_i, PK\}_{i=to\ n}$, Params): On input of an aggregate signature $\delta$, the message, public key pair ($m_i$, $PK_i$) of n different users and the public parameters Params, the algorithm returns "VALID" if $\delta$ is a valid aggregate signature on message-key pairs $m_i$, $PK_{i\ i=1}$ to n. Else, it will output "INVALID".

The security model for signature schemes with key split-up is same as that of the traditional signature schemes, by replacing the sign oracle modified into Sign-1 and Sign-2. The challenger C provides the forger F with a public key ("$PK_T$"). The forger can ask one of the partial private keys corresponding to $PK_T$ of its choice. A signature scheme with key split-up is secure against existential forgery under the adaptive chosen message attack, if no probabilistic polynomial time algorithm F has a non-negligible advantage in the following game:

Setup Phase: The challenger C generates the public parameters and sends it to the forger F. The challenger C also provides the forger with a public key $PK_T$ now decides to request one part of the private key of its choice.

Training Phase: The forger adaptively queries partial signatures on public key $PK_T$ with various messages of his choice.

Forgery Phase: Finally, F produces a valid message, signature pair ($m_T$, $\sigma_T$) signed under public key $PK_T$ on a message $m_T$.

Our game based definition of the security of aggregate signature schemes with key split is an adaption of the aggregate chosen-key security model. In this model, the challenger C provides the aggregated forger F with a single public key $PK_T$ and gives F the power to select all public keys except the challenger public key $PK_T$. An aggregate signature scheme with key split-up is secure against existential forgery under the adaptive chosen message attack, if no probabilistic polynomial time algorithm has a non-negligible advantage in the following game:

Setup Phase: The challenger C generates the public parameters and sends it to the aggregated forger F. The challenger C also provides the forger F with a public key $PK_T$ and access to one of the partial private key corresponding to $SK_T$ of F's choice.

Training Phase: The forger adaptively queries for signatures and partial signatures on public key $PK_T$ with various messages of his choice.

Forgery Phase: Finally, F outputs n=k+1 additional public keys $PK_1$, $PK_2$, . . . , $PK_{n-1}$, $PK_T$, messages m1, m2, . . .

mn−1, $m_T$ and an aggregated signature δ signed under public keys $PK_1$, $PK_2$, . . . , $PK_k$, $PK_T$ on the messages m1, m2, . . . mk, $m_T$ respectively. Here it should be noted that F has generated all the public keys $PK_1$, $PK_2$, . . . , $PK_k$ except $PK_T$ and the challenger C does not know the private key corresponding to $PK_1$, $PK_2$, . . . , $PK_k$.

The forger F wins the game if the aggregate signature δ is a valid aggregate of the signatures on the messages m1, m2, . . . mk, $m_T$ signed under public keys $PK_1$, $PK_2$, . . . , $PK_k PK_T$ respectively, such that the signature on message $m_T$ under $PK_T$ (i.e. both Sign-1$m_T$, $PK_T$) and Sign-2($m_T$, $PK_T$)) has not been queried upon by F.

An aggregate forger F(t, $q_H$, $q_s$, E) breaks an aggregate signature scheme with key split-up if F runs in time at most t, making $q_H$ hash queries $q_s$ signing queries and his advantage $AdV_{AggSigA}$ is atleast E. An aggregate signature scheme with key split-up is (t, $q_H$, $q_s$, E)-secure against existential forgery in the aggregate chosen key model if no (t, $q_H$, $q_s$, E) forger breaks it.

The Boneh-Lynn-Shacham(BLS) signature scheme is a signature scheme based on bilinear pairing of an elliptic curve group. Signatures produced by the BLS signature scheme are short, signatures. The signature scheme is provably secure (the scheme is existentially unforgeable under adaptive chosen-message attacks) assuming both the existence of random oracles and the intractability of the computational Diffie-Hellman problem in a gap Diffie-Hellman group.

The BLS signature scheme consists of the algorithms, Setup( ), KeyGen( ), Sign( ), and Verify( ) described in the following paragraphs.

Setup(κ): On input of the security parameter κ this algorithm will perform the following, Choose a large prime q. Choose two cyclic groups G and $G_T$ of order q, where G is additive group and $G_T$ is a multiplicative group. Choose the generator P ∈ G. Define the bilinear pairing e^: G×G→$G_T$. Define cryptographic hash function H {0, 1}$^{Im}$→G, where $I_m$ is the size of the message. Output the system parameters Params=(q, P, H, e^).

KeyGen(Params): This protocol is run by the user. This will output the public and private key of the user. Choose x ∈Zq*. Set X=xP ∈G. Output public key PK=(X) and private key SK=(x).

Sign(m, SK, Params): This protocol is run by user in the mobile. On input of message m and private key x, this will output the signature σ computed as shown below: Compute σ=xH(m, PK) ∈G. Output σ.

Verify(m, PK, Params): This protocol can be run by any user who possess the message m, signature on message m and public key PK, this algorithm will perform the following, Compute H=H(m, PK) ∈G. If e^(H, X)=$^?$ e^(σ, P) then output VALID, else output INVALID.

In one embodiment the BLS Scheme with key split up for secure wallet uses the following functions as described in the paragraphs below.

Setup(κ):On input of the security parameter κ this algorithm will perform the following. Choose a large prime q. Choose two cyclic groups G and $G_T$ of order q, where G is additive group and $G_T$ is a multiplicative group. Choose the generator P ∈G. Define the bilinear pairing e^: G×G→$G_T$. Define cryptographic hash function H: {0, 1}$^{Im}$×G→G, $I_m$ is the size of the message. Output the system parameters Params=(q, P, H, e^).

KeyGen(Params) This protocol is run by the user. This will output the public and private key of the user. Choose x ∈Zq*. Set X=xP ∈G. Output public key PK=(X) and private key SK=(x). [70] Key-Split(SK, Params): This protocol is run by the user. On input of private key x, this algorithm will output the two private keys $SK_1$ and $SK_2$ corresponding to private key SK. Choose x1 ∈Zq*. Set x2=(x-x1) ∈Zq*. Output private key pair $SK_2$=x2 and private key $SK_1$=x1. Here $SK_1$ is the private key corresponding to device 1 and $SK_2$ is the private key for device 2.

Sign-1(m, $SK_1$, Params): This protocol is run by user in the device 1. On input, of message m and private key x1, this will output the signature $σ_1$ computed as below: Compute $σ_1$=$x_1$H(m, PK) ∈G. Output $σ_1$.

Sign-2(m, $SK_2$, Params): This protocol is run by user in the device 2. On input of message m and private key x2, this algorithm will output the signature $σ_2$ computed as below: Compute $σ_2$=x2H(m, PK) ∈G. Output $σ_2$.

Sign-Combine($σ_1$, $σ_2$, Params): This protocol is run by user on device 1 with the partial signature $σ_1$ of device 1, partial signature $σ_2$ from device 2 and public parameters Params as inputs and outputs the signature σ on message m by the private key SK corresponding to the public key PK. Output σ=$σ_1$+$σ_2$=$x_1$H(m, PK)+$x_2$H(m, PK)=xH(m, PK).

Verify(m, σPK, Params): This protocol can be run by any user who possess the message m, a signature of the message m and the public key PK. This algorithm will perform the verification as following: Compute H=H(m, PK) ∈G. If e^(H, X)=e^(σ, P) then output VALID, else output INVALID.

In one embodiment, the BLS-Scheme with key split up and aggregation can be defined using, the functions described in the paragraphs below.

The aggregation mechanism is helpful during the verification of n signatures generated by n different users on n different messages $m_1$, $m_2$, $m_n$. The algorithms Setup( ), KeyGen( ), Key-Split( ), Sign-1( ), Sign-20, Verify( ) are same as that of the scheme given in Section 4.1. It has two more algorithms for generating aggregate signatures and verification of aggregate signatures, i.e., Aggregate-Sign( ) and Aggregate-Verify( )respectively. The description of both the algorithms is given below:

Aggregate-Sign(Σ={($m_i$, $σ_i$, $PK_i$)}$_{i=1\ to\ n}$, Params): This protocol is run by an user who has all the signatures in Σ as input and outputs the aggregate signature δ on message $m_i$ by the private key $SK_i$ corresponding to the public key $PK_i$, for i=1 to n.

If Verify($m_i$, $σ_i$, $PK_i$, Params) is VALID for all signatures $σ_i$ in Σ then output;

$$\delta = \sum_{i=1}^{n} \sigma_i.$$

Else, Output ⊥.

Aggregate-Verify(δ, {$m_i$, $PK_i$}i=1, to n, Params): This protocol can be run by any user who possess the messages $m_i$, public keys $PK_i$, and an aggregate signature δ. This algorithm will perform the signature verification as follows: For (i=1 to n), Compute Hi=H($m_i$, $PK_i$) ∈G $$\text{If } \prod_{i=1}^{n} \hat{e}(H_i, X_i) \stackrel{?}{=} \hat{e}(\delta, P)$$

then output VALID, else output INVALID.

Security proof of the proposed signature scheme with key split up is as follows.

Computational Diffie-Hellman (CDH) assumption: The Computational Diffie-Hellman (CDH) assumption in G is, given a tuple of elements (P, aP, bP) G, where a,b R $Z^*_q$, there exists no polynomial time adversary which can compute abP in G, with a non-negligible advantage.

Theorem 1. Let (G, $G_T$) be a (ti, Ei)-CDH group of order p. Then our signature scheme is (t, $q_{s1}$, $q_{s2}$, $q_{H1}$, E)-secure against existential forgery under the adaptive chosen-message attack in the random oracle model, for all t and E that satisfies, $$\epsilon' \geq \frac{\epsilon}{e(1+q_{s_2})}, \text{ and}$$

$$t' \leq t + (q_{H_1} + q_{s_1} + q_{s_2} + O(1))$$

Proof. Suppose is a forger algorithm that (t, $q_{s1}$, $q_{s2}$, E)-breaks our signature scheme on (G, $G_T$) in time t. Then, we show how to construct a ti-time algorithm C that solves the CDH problem on (G, $G_T$) with probability atleast Ei. The existence of such polynomial time solver for CDH problem is not possible, hence the existence of polynomial time attacker for the signature scheme is also not possible. Let P be the generator of G. Algorithm C is provided with the challenge instance (P, aP, bP) G whose goal is to generate abP G. Forger interacts with the challenger C and the challenger will answer all the queries asked by the Forger in the following way described by functions in the following paragraphs.

Setup Phase: Challenger C starts by giving F the common reference string (P, G, $G_T$) and the public key $PK_T$=(XT=(s1+s2a)P)), where s1, s2 is chosen at random from $Z^*_q$. The corresponding private key xT=s1+s2a, which is not known to the challenger. Now, F will request C the partial key $SK_1$ or $SK_2$ which F wishes to compromise. If he decides to get access to partial private key $SK_1$ then $x_1$=$s_1$ and $x_2$=$as_2$. If F decides to get access to partial private key $SK_2$ then $x_1$=$as_2$ and $x_2$=$s_1$. Note that C does not know the value of either $x_1$ or $x_2$. For simplicity we assume that F decides to compromise partial private key $x_1$.

Training Phase: During this phase, F is given access to the following oracles provided by the challenger C: H query: C handles the hash queries of the forger F by maintaining a list LH consisting of tuples defined as m, PK, c, h, $H_m$. Initially the list is empty and is updated as explained below. When queries the oracle H with a message m $\in\{0, 1\}^{lm}$ and public key PK as input, C responds in the following, way: If a tuple (m, PK, c, h, $H_m$) already exists in the $L_H$ list, then C responds with H(m, PK)=$H_m$ $\in$G. Otherwise, C picks a random h $\in Z^*_q$ and flips a coin c $\in\{0, 1\}$ such that Pr[c=0]=$\gamma$ (defined later) and sets $H_m$=hbP if c=1, Else, it sets $H_m$=hP. Also, C stores the tuple (m, PK, c, h, $H_m$) in $L_H$ list and output $H_m$.

Sign-1 query: When a signature query is generated for device 1, C does the following: C queries H(m, PK) to obtain $H_m$. C computes $\sigma_1$=$x_1 H_m$. C sends $\sigma_1$ as the signature to A.

Sign-2 query: When a signature query is generated for device 2, C does the following: C checks whether (m, PK) is already present $L_H$ list. If (m, PK) belongs to $L_H$ list, then: C retrieves the tuple (m, PK, c, h, $H_m$) from $L_H$ list. If c=0, sets $\Sigma_2$=$s_2$haP=$as_2$=$x_2 H_m$. Else, Aborts. If (m, PK) does not belong to $L_H$ list, then: C picks a random h $\in Z^*_q$. C sets $H_m$=hP and c=0. Also, C stores (m, PK, c, h, $H_m$) in $L_H$ list. C computes $\Sigma_2$=$s_2$haP=($as_2$)hP=$as_2 H_m$=$x_2 H_m$. C sends $\Sigma_2$ as the signature to F.

Forgery Phase: On getting sufficient training, algorithm produces a message-signature pair (m*, $\Sigma$*) such that $\Sigma$* is not obtained by querying the signing oracle for a message m* and $\Sigma$* is valid. Now, C computes the solution to the hard problem as, shown below. C checks $L_H$ for a tuple (m*, PK, c, h, $H_m$*). C computes T=$(hs_2)$-1($\pi$*$h_{s1}$P). This correctly generates the solution to the hard problem T=abP as below.

$$T = (hs_2)^{-1}(\sigma^* - hs_1 P)$$
$$= (hs_2)^{-1}(x(hP) - hs_1 P)$$
$$= (hs_2)^{-1}((s_1 + s_2 a)hP - hs_1 P)$$
$$= (hs_2)^{-1}(s_1 hP + s_2 abhP - hs_1 P)$$
$$= (hs_2)^{-1}(s_2 abhP)$$
$$= abP$$
$$= LHS.$$

No forgery is possible by F in polynomial time with a non-negligible advantage.

Probability Analysis: We calculate the probability with which C aborts during the simulation. Let Abort denote the event that C aborts during the game and $q_{s2}$ denote the number of queries made to the Sign-2 oracle. We note that C does not abort in the following events: E1: c=0 in a Sign-2 query of Training phase. E1: c*=1 in the Forgery phase.

We have $Pr[\neg \text{Abort}] \geq \gamma^{q_{s2}}(1-\gamma)$, which has a maximum value at $\gamma_{OPT} = \frac{q_{s_2}}{1+q_{s_2}}$.

Using $\gamma_{OPT}$, we obtain:

$$Pr[\neg \text{Abort}] \geq \frac{1}{e(1+q_{s_2})},$$

where, e is the base of the natural logarithm.

Note that the simulation of the random oracles is perfect.

Therefore, C solves the CDH problem in ($\mathbb{G}, \mathbb{G}_T$) with probability.

$$\epsilon' \geq \frac{\epsilon}{e(1+q_{s_2})}.$$

Note that C solves the hard problem after the forger F makes $q_H$ queries to the H oracle, $q_{s1}$ queries to the Sign-1 oracle, $q_{s2}$ queries to the Sign-2 oracle and generates a forged signature. Also, given the forged signature, the challenger extracts the solution to the CDH problem with (1) computation. Therefore the total time t' taken by C in solving the hard problem is as below: t'<t+($q_H$+$q_{s1}$+$q_{s2}$+O(1)). If t is a polynomial, it would imply that ti is also a polynomial which contradicts the assumption that (G, $G_T$) is a CDH group pair. This completes the proof of the theorem.

Security proof of aggregate signature scheme with key split up is described in the following paragraphs.

Theorem 2. Let (G, $G_T$) be a (ti, Ei)-CDH group of order p. Then our signature scheme is (t, $q_{s1}$, $q_{s2}$, $q_{H1}$E)-secure against existential forgery under the adaptive chosen-message attack in the random oracle model, for all t and E that satisfies, $$\epsilon' \geq \frac{\epsilon}{e(1+q_{s_2})}, \text{ and}$$

$$t' \leq t + (q_{H_1} + q_{s_1} + q_{s_2} + O(1))$$

Proof. Suppose is a forger algorithm that (t, $q_{s1}$, $q_{s2}$, $q_{H1}$, E)-breaks our signature scheme on (G, $G_T$) in time t. Then, we show how to construct a ti-time algorithm C that solves the CDH problem on (G, $G_T$) with probability atleast Ei. The existence of such polynomial time solver for CDH problem is not possible, hence the existence of polynomial time attacker for the signature scheme is also not possible Let P be the generator of G. Algorithm C is provided with the challenge instance (P, aP, bP) G whose goal is to generate abP G. Forger interacts with the challenger C and the challenger will answer all the queries asked by the Forger in the following way:

Setup Phase: This phase is similar to the Setup Phase described earlier.

Training Phase: During this phase, F is given access to the following oracles provided by the challenger C: H query: C handles the hash queries of the forger F by maintaining a list $L_H$ consisting of tuples defined as m, PK, c, h, $H_m$. Initially the list is empty and is updated as explained below. When F queries the oracle H with a message m 0, 1 Im and public key PK as input, C responds in the following way:

If (PK/=$PK_T$):

If a tuple (m, PK, c, h, $H_m$) already exists in the $L_H$ list, then C responds with H(m, PK)=$H_m \in G$.

C picks a random h $\in Z^*_q$ sets $H_m$=hP, Also, C stores the tuple (m, PK, -,h, $H_m$) in $L_H$ list and output $H_m$.

If (PK=$PK_T$):

If a tuple (m, PK, c, h, $H_m$) already exists in the $L_H$ list, then C responds with H(m, PK)=$H_m \in G$.

Otherwise, C picks a random h $\in Z^*_q$ and flips a coin c $\in \{0, 1\}$ such that Pr[c=0]=γ (defined later) and sets $H_m$=hbP if c=1, Else, it sets $H_m$=hP. Also, C stores the tuple (m, PK, c, h, $H_m$) in $L_H$ list and outputs $H_m$.

Sign-1 query: When a Sign-1 is requested by F, C does the following: C queries H(m, PK) to obtain $H_m$. C computes $\Sigma_1$=$H_m$. C sends $\sigma_i$ as the signature to A.

Sign-2 query: When a Sign-2 is requested by F, the challenger C does the following: C checks whether (m, PK) is already present $L_H$ list. If (m, PK) belongs to $L_H$ list, then C retrieves the tuple (m, PK, c, h, $H_m$) from $L_H$ list. If c=0, sets $\Sigma_2$=$s_2$haP=$as_2 H_m$=$x_2 H_m$. Else, Aborts. If (m, PK) does not belong to $L_H$ list, then C picks a random h $\in Z_q^*$. C sets $H_m$=hP and c=0. Also, C stores (m, PK, c, h, $H_m$) in $L_H$ list. C computes $\Sigma_2$=$s_2$haP=$(as_2)$hP=$as_2 H_m$=$x_2 H_m$. C sends $\Sigma_2$ as the signature to F.

Forgery Phase: On getting sufficient training, algorithm F produces a n message-public pair $(m_i, PK_i)$, $(m_T, PK_T)$ i=1 to k, where (n=k+1) and a valid aggregate signature δ such that $m_T$, $PK_T$ is not queried to both Sign-1 and Sign-2 oracle. Now, C computes the solution to the hard problem as shown below.

For all $i = 1$ to $k$, C checks and retrieves $h_i$ from the entry $\langle m_i, PK_i, -, h_i, H_{m_s} \rangle$ in $L_H$ list.

C retrieves $h$ corresponding to $(m_T, PK_T, c, h, H_{m_T})$ in $L_H$ list.

Computes $T = (hs_2)^{-1}\left(\delta - \sum_{i=1}^{k}(h_i PK_i) - hs_1 P\right)$. This correctly generates the solution to the hard problem $T = abP$ as below.

$$\begin{aligned}
T &= (hs_2)^{-1}\left(\delta - \sum_{i=1}^{k}(h_i PK_i) - hs_1 P\right) \\
&= (hs_2)^{-1}\left(\sum_{j=1}^{n}(x_j H_j) - \sum_{i=1}^{k}(h_i X_i) - hs_1 P\right) \\
&= (hs_2)^{-1}\left(\sum_{j=1}^{k}(x_j H_j) + x_T H_T - \sum_{i=1}^{k}(x_i H_i) - hs_1 P\right) \\
&= (hs_2)^{-1}(x_T H_T - hs_1 P) \\
&= (hs_2)^{-1}((s_1 + s_2 ab)hP - hs_1 P) \\
&= (hs_2)^{-1}(s_1 hP + s_2 abhP - hs_1 P) \\
&= (hs_2)^{-1}(s_2 abhP) \\
&= abP \\
&= LHS.
\end{aligned}$$

Thus, no forgery is possible by F in, polynomial time with a non-negligible advantage.

Probability Analysis: We calculate the probability with which C aborts during the simulation. Let Abort denote the event that C aborts during the game and $q_{s2}$ denote the number of queries made to the Sign-2 oracle. We note that C does not abort in the following events:

$E_1$: $c = 0$ in a Sign-2 query of Training phase.

$E_1$: $c^* = 1$ in the Forgery phase.

We have $Pr[\neg \text{Abort}] \geq \gamma^{q_{s2}}(1 - \gamma)$, which has a maximum value at $\gamma_{OPT} = \frac{q_{s_2}}{1+q_{s_2}}$.

Using $\gamma_{OPT}$, we obtain:

$$Pr[\neg \text{Abort}] \geq \frac{1}{e(1+q_{s_2})},$$

where, $e$ is the base of the natural logarithm

Note that the simulation of the random oracles is perfect.

Therefore, C solves the CDH problem in ($\mathbb{G}$, $\mathbb{G}_T$) with probability:

$$\epsilon' \geq \frac{\epsilon}{\epsilon(1+q_{s_2})}.$$

Note that C solves the hard problem after the forger F makes $q_H$ queries to the H oracle, $q_{s1}$ queries to the Sign-1 oracle, $q_{s2}$ queries to the Sign-2 oracle and generates a forged signature. Also, given the forged signature, the challenger extracts the solution to the CDH problem with (1) computation. Therefore the total time t taken by C in solving the hard problem is as below:

$$t' \leq t + (q_H + q_{*1} + q_{*2} + \mathcal{O}) \quad (1)$$

If t' is a polynomial, it would imply that t is also a polynomial which contradicts the assumption that $\mathbb{G}$, $\mathbb{G}_T$) is a CDH group pair. This completes the proof of the theorem.

Multi-signatures is a special case of signature aggregation where the message to be signed, is same for all the parties involved in the signature generation process. Typically, this calls for a coordinated way of generating the multi-signature and this is in contrast to the signatures in the transactions which are independently generated. While the BLS scheme works well for general aggregation, it suffers from a subtle flaw when used for aggregation or multi-signature in blockchain. However, there is an easy fix by including the public key of the signer along with the message to be signed.

Based on the proposed protocol, we present the computational complexity and storage complexity for the generation and verification of a single signature and n signatures for Schnorr, ECDSA, ⌈-signatures and our approach in Table 3. Note that, both Schnorr and ECDSA signature schemes do not allow key-aggregation nor key-split. Our signature scheme requires only one pairing operation for verifying an aggregate signature, which is more efficient than the Schnorr, ECDSA and I signatures, where the time taken increases with the number of signatures combined.

In Table 4, we provide the time taken (in microseconds (μs), milliseconds (ms) and seconds (s)) for the aggregation, verification of n signatures and also the time for verification of an n-signatures aggregation for values n=1, 100, 300, 400, 500 and 1000 signatures. The different implementations on performance are tested under 2.4 GHz Intel Core 17 quad-core processor. The programming language used is Go language, and the programming tool is Goland 2018.2. For symmetric bilinear pairing operation, we have used the PBC wrapper around the Pairing-Based Cryptography (PBC) Library in the implementation of our signature protocol, which is constructed on the curve $y2=x3+x$ over the field Fq for some prime q=3 mod 4. The Schnorr signature is implemented on the edwards25519-curve, which is the current, standard deployed in cryptocurrencies for fast performances. We have implemented the ECDSA signature scheme on the Koblitz curve secp256k1 over Fq as defined in FIPS 186-3. The r signature is also constructed on the secp256k1 curve as per the protocol. From the performance comparison, it is evident that our scheme is more efficient than the existing aggregatable 1-signature scheme, and also provides the added functionality of key split-up.

In one embodiment, secure wallet enables a user to transact safely and securely without MFA (multi-factor authentication) or the need for a private key. User uses MDA (multi-device authentication) with two devices (laptop and mobile) to complete a transaction. Even if one device is lost or compromised, the transaction won't go through. The lost key can be recovered with the saved mnemonic.

Initial setup: 1) User installs Ochain app on Device 1 (say Laptop) and Device 2 (Mobile) 2) User enters a mnemonic (mn1) on Device 1 which generates a private key, $SK_1$ and saves it. A public key is generated based on this private key using BLS. 3) User enters another mnemonic (mn2) on Device 2 with generates a string s1 on device 2 and saves it. 4) User enters a pin/pass-phrase, s2, on Device 2. A new private key, $SK_2$, is computed by combining s1 and s2. A public key is generated based on this private key using BLS. The pin/pass-phrase is never saved on Device 2. 5) At this stage, Device 1 has $SK_1$, $SK_2$ (persisted) and Device 2 has $s_2$, $pk_2$ (persisted). $SK_2$ itself is not stored on Device 2.6) Very first time of the setup process, $SK_2$ is sent to Device 2 which will combine with $SK_1$ and creates the primary secret key, SK. From this, using BLS, the public key is computed. Client ID is the hash of the public key. The client id and public key are registered on to the block chain. In addition, Device 1 can optionally send the client id to Device 2 (if user wants to sign the transaction first on device 1 and then on device 2 and submit it to the blockchain). Note that sending the $SK_2$ to Device 1 is done only once at the time of the initial setup.

This completes the process and the primary key never needs to be saved anywhere. User should ensure the mnemonics mn1 and mn2 are securely stored digitally or other means. Same is the case with the pin/pass-phrase if there is a concern with remembering it.

To submit a transaction the following steps are performed. 1) User initiates the transaction payload on Device 2. As part of the signing process, user is prompted to enter PIN/Pass-phrase. Using the input and S2, $SK_2$ is computed (in-memory and never persisted) and then the signature of the payload, sig1, is computed. 2) User sends sig1 along with the payload to Device 1. Device 1 computes signature sig2 and combines them both and submits the transaction Note that it's also possible to first sign from Device 1, send it to Device 2 and then submit it. For this to happen, Device 2 needs to know the client id which is mentioned as an optional step in 6 of the setup process.

In one embodiment, either Device 1 or Device 2 can submit a transaction. Device 1 submitting the transaction to the blockchain uses the following steps: 1) User enters the transaction on device 2 and enters a PIN and signs it. 2) Then the transaction and the signature is sent to device 1 via wifi, Bluetooth, or near field communication. 3) Device 1 signs the transaction with its split key and combines both signatures. 4) Device 1 sends the transaction to the blockchain.

Device 2 submitting the transaction to the blockchain using the following steps: 1) User enters the transaction on device 1. 2) A QR code is displayed which contains the transaction details and the device 1's signature. Optionally, the syncing can be done using wifi, Bluetooth or near field communication. 3) Device 2 scans this and prompts user for the PIN. Then it signs and combines both signatures. 4) Device 2 sends the transaction to the blockchain. Note that in both the above cases, the device receiving the partial signature form the other can verify another's authenticity by verifying it using the public key associated with the split keys. In addition, Device 2 can verify its own signature to ensure the PIN entered is correct.

In one embodiment, smart contracts are used in combination with secure wallet for password-less logins and secure credit card applications using multiple device authentication as described above.

Different embodiments described herein include components or structures to perform the described functionality. A "component" or a "module" as used in this invention disclosure, includes a dedicated or shared processor and, typically, firmware or software modules executed by the processor. Depending upon implementation-specific or other considerations, a module can be centralized or its functionality distributed. A component or a module can include special purpose hardware, firmware, or software embodied in a computer-readable medium for execution by the processor.

In one embodiment, FIG. 1 depicts a diagram 100 illustrating an example of an aggregate signing and verification systems with key split ups. In the example of FIG. 1, the environment includes a first client system 110-1 through an nth client system 110-*n*, each client having multiple hardware devices 120-1-*a*, 120-1-*b* through 120-1-*n*, network 140, aggregate user system 130-1 through an nth system 130-*n* and aggregate user verifying system 150-1 through nth system 150-*n*. In an implementation, the client system 110 includes components to request different key management operations. In one implementation, the client system 110 includes modules to start with a primary key and generate partially split keys that depend on the primary key. A client can implement many types of flexible and distributed applications on the client system 110 using the client aspect of the blockchain.

In one implementation, the device 120-1-a and 120-1-b both belong to client 110-1. Client sends his private key to Device 120-1-a to be split. One split key is stored on 120-1-a and another split, key is stored on 120-1-b. A quick response code can be generated by comparing the split key to the primary key. In one embodiment the two devices communicate with each other securely using public key verifications.

Users interact using, crypto keys with a blockchain. Since the crypto currency balance is maintained against these keys, it's very important to protect the private key. Ochain uses BLS signatures to provide additional security by providing a mechanism to split the original key into two secondary keys and storing each of the secondary key on a different device. Signing requires individual signatures from each device. Hence, losing any one device can still protect the primary key. In addition, optionally one of the secondary key can further be split into two parts only one of which is stored on the device and the other is a simple personal identification number ("PIN") that the user has to enter each time. This provides an extra layer of protection in case both devices are compromised. In this scheme, it is easy to generate as many split keys as desired providing the ability for the user to periodically rotate the split keys and in the process change the PIN.

Initial setup flow for setting up the keys can be as follows, in one embodiment. 1) User downloads Ochain app on to a laptop and a mobile. 2) On device 1, the user enters a mnemonic and generates a primary key. This is never saved on the device. User is expected to securely store the mnemonic so that it is possible to regenerate the same primary key if ever needed, like when generating secondary split keys. 3) User is prompted to go through the split key process. When this option is selected, a random split key pair is generated. Then the difference of the primary private key and the split private key is computed, as the 2nd split key and displayed as a QR value. Device 1 also computes the public key of this second split key and stores it so it can validate any incoming signatures. 4) From the device 2, the QR value is canned using the app. Optionally the value can also be synced to device 2 via wifi, Bluetooth or another near field communication transmission protocol. Upon getting the value, the app on device 2 prompts the user for a PIN. Once the pin is entered, the device computes the difference between the private key and the pin and persists it. In order for this device to sign, it needs to reconstruct the private key by first getting the PIN from the user and then adding it to the local value. If user expects Device 2 to submit the final transaction to the blockchain, Device 1 also sends the public key associated with its split key. 5) On device 2, a "verify" option will sign a random text and sends both the random text and the signature to device 1. Device 1 then signs the random text with its own split key and combines both signatures. It also computes the signature using the in-memory private key. If both the signatures matches, then the setup is done correctly and the in-memory private key can be discarded. 6) After successful setup, device 1 can register the public key and client id associated with the primary key to the blockchain. This completes the setup.

In one embodiment, the initial setup of keys can be changed at any time. Changing PIN/Regenerate the secondary keys can be done as follows. 1) User enters the original mnemonic on device 1 which generates the keys. 2) Follows step 3 to 5 from the above Initial setup.

In one embodiment, the mnemonic are used to generate one or more of the split keys that add up to the primary key.

In one implementation, the aggregate user 130-1 includes components to aggregate sign two or more messages received from different clients when the messages are signed with split keys and a short compressed signature is generated using two or more split keys.

Network 140 can be different wireless and wired networks available to connect different, computer devices including client and server systems. In an implementation, network 140 is publicly accessible on the internet. In an implementation, network 140 is inside a secure corporate wide area network. In an implementation, network 140 allows connectivity of different systems and devices using a computer-readable medium. In an implementation, the block chain platform using the client system, the blabber, the sharder or the miner performs different key management, signing and verification functions.

The messaging and notification between different components can be implemented using, application programming interface (API) calls, extensible markup language ("XML") interfaces between different interfaces, Java/C++ object oriented programming or simple web-based tools. Different components may also implement authentication and encryption to keep the data and the requests secure.

Figure 2:
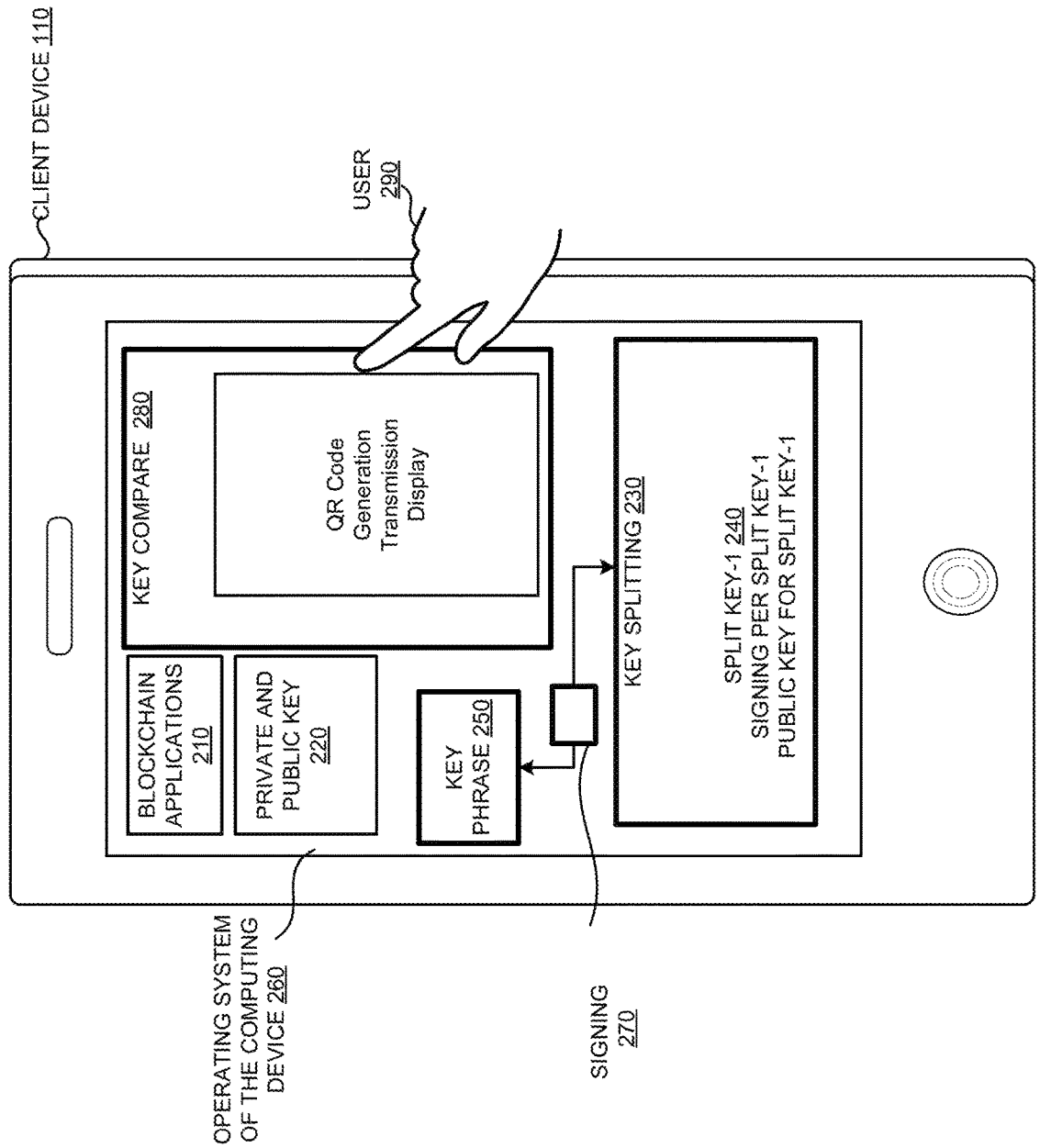
FIG. 2 shows an exploded view of a client computing system illustrating different subroutines, according to one embodiment.

FIG. 2 is an exploded view of a client system 110 shown in FIG. 1 For a blockchain for automated client key management, the client has a blockchain applications 210 that interacts with the operating system 260 of the client computing device. The client manages security of different blockchain applications using private and public key pair 220. A client may also use a key phrase or mnemonic 250. Signing a message is an operation triggered at 270. The client may invoke key splitting 230 that includes split key operations 240, signing using one of the split keys and generating public key for the split key. Key verification and comparison allow the client to verify the received messages and also generate a quick response code, transmit the code and display the code as needed for different applications. A user 290 is shown using the client device 110.

In one embodiment, the client device 110 includes smart contract applications using secure wallets with multiple device authentications using split keys. Smart contracts can be used in combination with secure wallet for password-less logins and secure credit card applications. In this scenario, the application has a smart contract that accepts a secure wallet transaction and enables login to their website. In one embodiment, a secure credit card application can be executed where when you swipe the credit card, it sends a transaction to the credit card issuer smart contract, who then enables the transaction to go through. The use of the credit card transaction is secure using a password less login.

Figure 3:
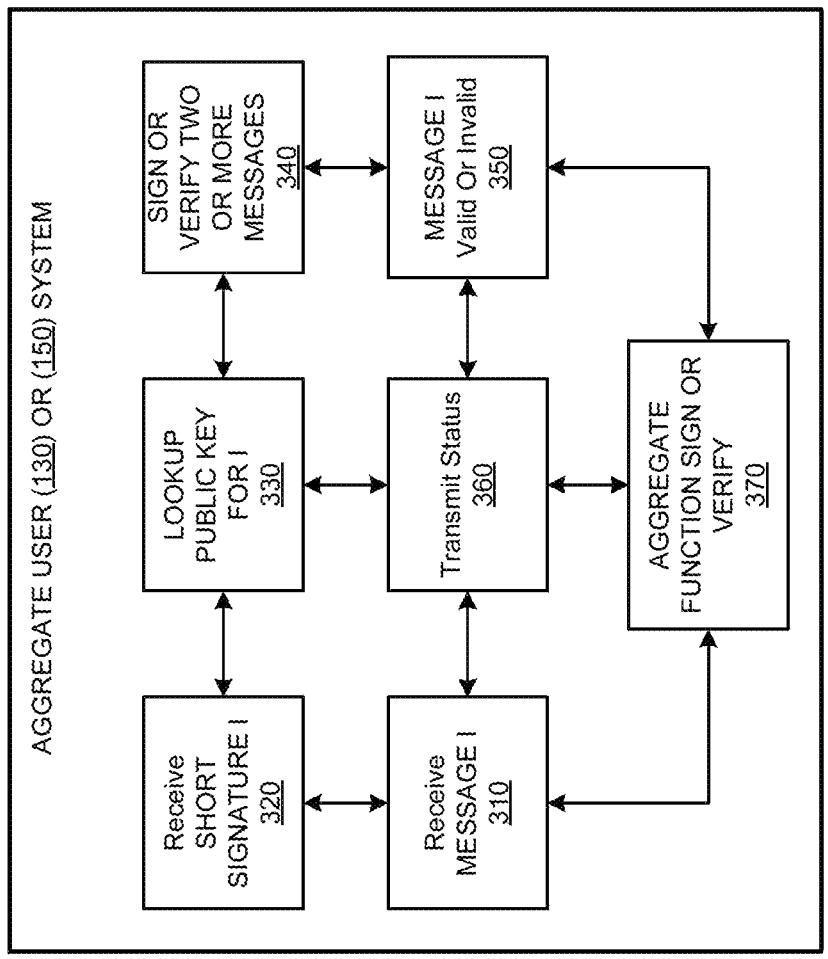
FIG. 3 is an exploded view of an aggregate user for signing or verification computing system illustrating different modules and functions, according to one embodiment.

FIG. 3 is an exploded view of an aggregate user 130 or 150 for signing or verification of FIG. 1. The different components or modules included in a miner, blobber or sharder system on a blockchain that includes a module to process aggregate function sign or verify requests 370, receive message i from client 310, receive short signature i 320, lookup or receive corresponding public key for i 330, sign or verify two or more messages 340, verify whether message i is invalid or valid 350 and transmit the status at 360. In one implementation, the look up of public key may be based on client identification registration database that stores different public keys for clients.

FIG. 4 is a table view describing different steps of key split algorithm, in one embodiment. The BLS keys are started with public and private key generation that together form a compressed short signature. Device 1 uses split key x1 and Device 2 uses split key x2 both of which are derived from the private key x. The messages are then signed using x1 and x2 and then combined to generate short compressed signature.

FIG. 5 is a table view of algorithm used for signing workflow, in one embodiment. Device 2 accepts the passcode and generates the split key signature. Device 1 can verify the actions performed by Device 2 and then combine the split key signatures to generate a short compressed signature.

Figure 6:
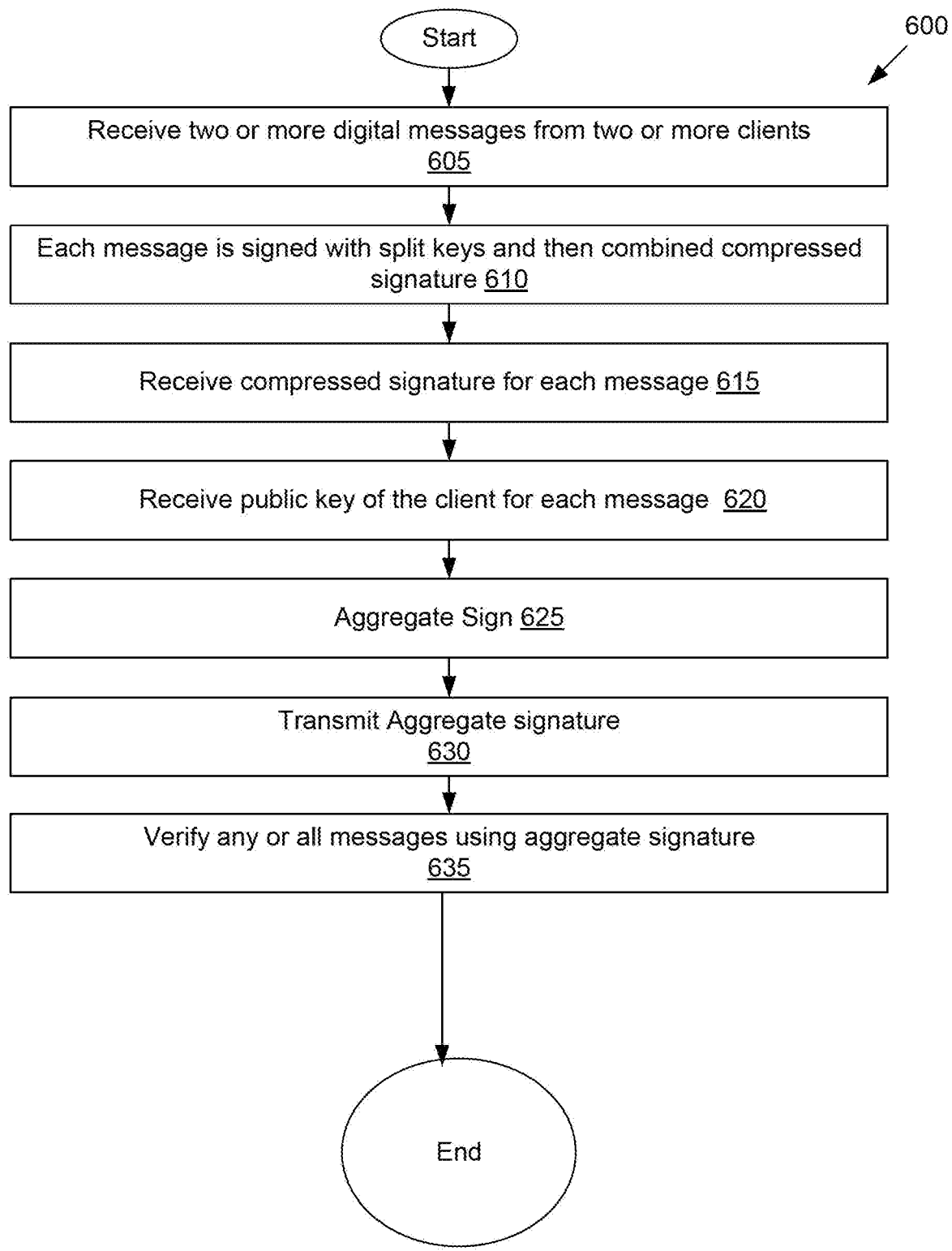
FIG. 6 shows a flowchart illustrating an example of a method of aggregate signing.

FIG. 6 depicts a flowchart 600 illustrating an example of a method for a blockchain platform for aggregate signing of multiple digital signatures simultaneously using key splitting. The flowchart 600 is discussed in conjunction with the blockchain platform environment shown in the diagram 100 in FIG. 1. At block 605, an aggregate user receives two or more digital messages from two or more clients. At block 610, each message is signed with split keys and then combined to generate a short compressed signature. At block 615, receive compressed signature for each message. At 620, receive public key of the client for each message. At 625, aggregate sign all of the messages. At 630, transmit the aggregate signature. At 635, verify any or all of the messages using the aggregate signature.

It can be noted that the aggregate verification is n+1 operation instead of 2n by aggregating the signature using symmetric bilinear pairing operation for the keys. By using symmetric pairing for computation speed up, the pairing used is e: G*G–>G, where both the source and target group is the same. In one embodiment, for verification without using aggregation of N signatures, we need a total of 2N pairing operations. For verification with aggregation, we need a total of N+1 pairing operations. Pairing operation cannot be avoided as it is required for verification of signatures in our scheme. In EC25519 signature scheme, the ec25519 curve used supports faster computations as attached in the comparison Table 4 given in FIG. 9. Note that Ec25519 curve doesn't support pairing operation. The table shows the time taken for one exponentiation using ec25519 curve VS time taken for one pairing operation using the curve in our scheme that supports pairing. Our curve is as per FIPS standard that is implemented using PBC library. Ec25519 doesn't support the key-split up technique nor aggregation which is supported by our protocol, which is only possible using pairing operation. In one embodiment, the system specifications of the machine to support multi-threading generically include an Intel Xeon E5-2650 v2 processor machine with 32 cores clocked at 2.6 GHz with 100 GB RAM using operating system of CentOS 6.5 and 2.6.32-431 Linux kernel.

In broad embodiment, the invention is systems and methods of aggregate signing multiple messages simultaneously using key-splitting.

Figure 7:
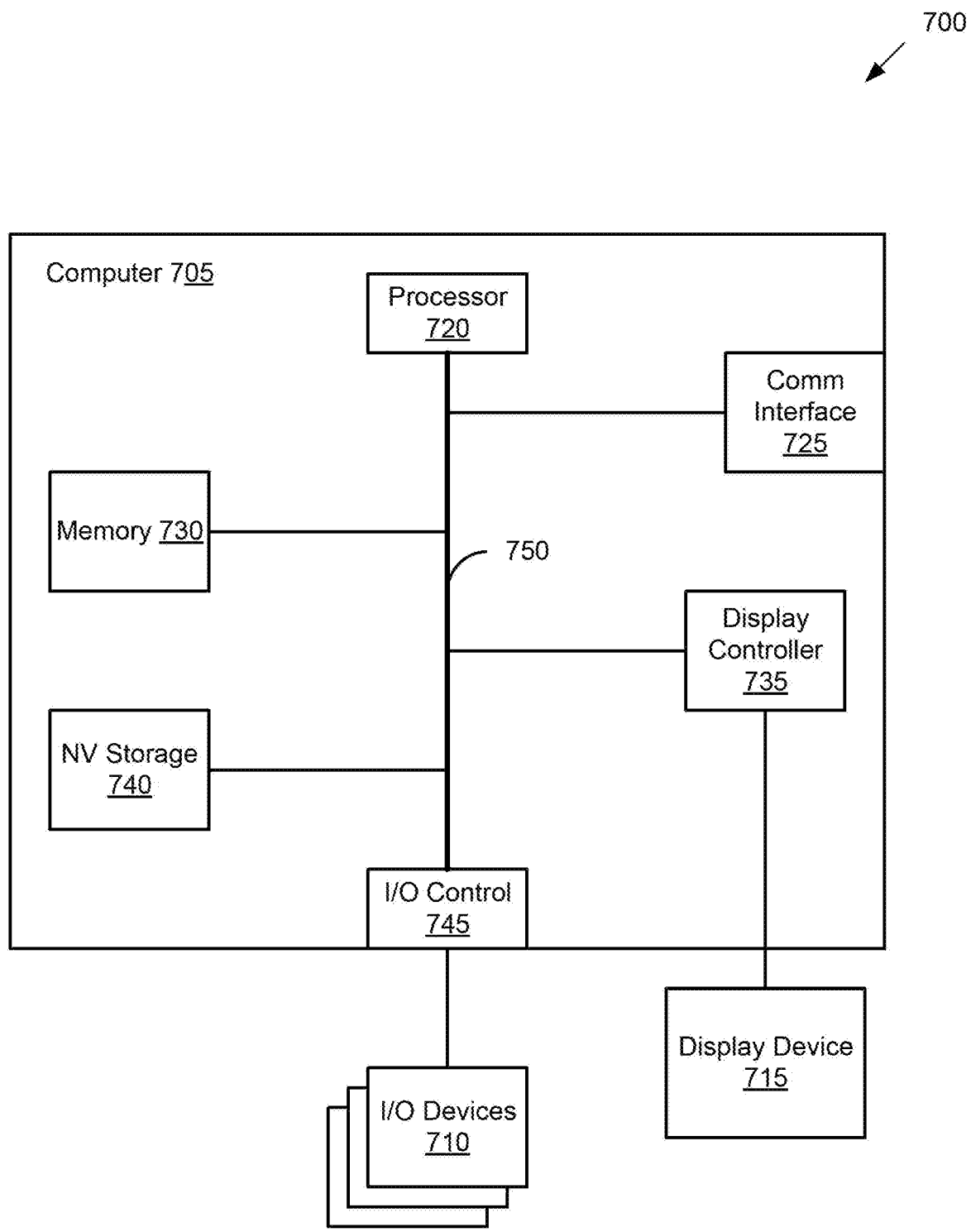
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, client system 110, a miner system 120 and/or blabber system 130 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only, physical media, such as memory. As used here, a computer-readable medium is, intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a compute readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog, modem, isdn modem, cable modem, token ring interface, satellite transmission interface (e.g. "direct PC"), or other interfaces for coupling a computer system to other computer systems. Interfaces enable computer systems and other devices to be coupled together in a network.

Several components described here, including clients, servers, and engines, can be compatible with or implemented using a cloud-based computing system. As used here, a cloud-based computing system is a system that provides computing resources, software, and/or information to client systems by maintaining centralized services and resources that the client systems can access over a communications interface, such as a network. The cloud-based computing system can involve a subscription for services or use a utility pricing model. Users can access the protocols of the cloud-based computing system through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided, by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention.

These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It, has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are mere y convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples, of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

FIG. 8 shows Table 3 describing the efficiency comparisons described earlier. FIG. 9 shows performance evaluation Table 4 described earlier.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method of aggregate signing of digital signatures on multiple messages simultaneously, comprising:

receiving two or more digital messages
wherein each message is signed using two or more digitally split keys from a
private key and
the two or more digital signatures of the message using the split key are
combined to get a compressed short signature;
receiving the compressed short signature for each message;
receiving a public key associated with the private key for each message;
aggregate signing the messages to output an aggregate signature; and
computing the difference between the private key and each split key to generate a Quick Response code that is used to combine the two or more digital signatures.

2. The method of claim 1, wherein the aggregate signing includes using public parameters that apply to the messages.

3. The method of claim 1, wherein the split key is performed using Boneh-Lynn-Shacham short signature scheme.

4. The method of claim 1, wherein each split key is associated with a hardware device and combining the two or more digital signatures of the message occurs at one of the hardware devices.

5. The method of claim 1, further comprising:
verifying the Quick Response code using the public key for the split key.

6. The method of claim 1, further comprising:
generating a random text message for signing.

7. The method of claim 1, wherein receiving the public key for a signed message is from a client identification registry.

8. The method of claim 1, further comprising:
verifying the aggregate signature for any of the message.

9. The method of claim 1, further comprising:
verifying the aggregate signature for all of the messages.

10. A system of aggregate signing of digital signatures on multiple messages simultaneously, comprising:
a module to receive two or more digital messages
wherein each message is signed using two or more digitally split keys from a
private key and
the two or more digital signatures of the message using the split key are
combined to get a compressed short signature;
a module to receive the compressed short signature for each message;
a module to receive a public key associated with the private key for each message;
a module to aggregate sign the messages to output an aggregate signature; and a module to compute the difference between the private key and each split key to generate a Quick Response code that is used to combine the two or more digital signatures.

11. The system of claim 10, wherein the aggregate signing includes using public parameters that apply to the messages.

12. The system of claim 10, wherein the split key is performed using Boneh-Lynn-Shacham short signature scheme.

13. The system of claim 10, wherein each split key is associated with a hardware device and combining the two or more digital signatures of the message occurs at one of the hardware devices.

14. The system of claim 10, further comprising:
a module to verify the Quick Response code using the public key for the split key.

15. The system of claim 10, further comprising:
a module to generate a random text message for signing.

16. The system of claim 10, wherein receiving the public key for a signed message is from a client identification registry.

17. The system of claim 10, further comprising:
a module to verify the aggregate signature for any of the message.

18. The system of claim 10, further comprising:
a module to verify the aggregate signature for all of the messages.

* * * * *